United States Patent
Iikura

(10) Patent No.: US 7,189,084 B2
(45) Date of Patent: Mar. 13, 2007

(54) CONNECTOR COVER FOR PORTABLE TERMINAL

(75) Inventor: Kenji Iikura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/052,922

(22) Filed: Feb. 9, 2005

(65) Prior Publication Data

US 2005/0181640 A1    Aug. 18, 2005

(30) Foreign Application Priority Data

Feb. 12, 2004    (JP)    ............... 2004-034454

(51) Int. Cl.
*H01R 13/44*    (2006.01)
(52) U.S. Cl. ............... 439/135; 439/148
(58) Field of Classification Search ............ 439/135 I, 439/378, 953, 148, 567, 135; 312/293.3
See application file for complete search history.

(56) References Cited

U.S. PATENT DOCUMENTS

| | | | |
|---|---|---|---|
| 3,686,616 A | | 8/1972 | Bowerman |
| 5,199,776 A | * | 4/1993 | Lin ........................ 312/293.3 |
| 5,724,226 A | * | 3/1998 | Ruch et al. ............... 361/683 |
| 5,795,177 A | * | 8/1998 | Hirono .................... 439/378 |
| 6,125,029 A | * | 9/2000 | Sasaki et al. ............. 361/681 |
| 6,142,805 A | * | 11/2000 | Gray et al. ............... 439/206 |
| 6,390,848 B1 | * | 5/2002 | Murakami et al. .......... 439/587 |
| 6,406,321 B1 | * | 6/2002 | Hayashi et al. ............ 439/374 |
| 6,832,921 B1 | * | 12/2004 | Stewart .................... 439/134 |
| 2003/0082943 A1 | * | 5/2003 | Chen et al. ............... 439/367 |

FOREIGN PATENT DOCUMENTS

| | | |
|---|---|---|
| EP | 1139501 A2 | 10/2001 |
| GB | 2220803 A | 1/1990 |
| JP | 5-299137 A | 11/1993 |
| JP | 2001-317774 A | 11/2001 |
| JP | 2003-158563 A | 5/2003 |
| JP | 2003-258964 A | 9/2003 |
| JP | 2003-272753 A | 9/2003 |

* cited by examiner

*Primary Examiner*—Thanh-Tam Le
(74) *Attorney, Agent, or Firm*—Sughrue Mion, PLLC

(57) ABSTRACT

To provide a connector cover for a portable terminal, capable of securely closing an opening in a casing so as to prevent dust from entering, without being influenced by deformation and dimensional changes due to secular change, etc. Protruding portions are formed on the base parts of the columnar connecting parts inserted and fitted in the holes in both sides of the opening, and the protruding portions engage with the holes from the rear face sides in the state of the columnar connecting parts having been inserted in the holes completely. Thereby, regardless of deformation and dimensional changes of the columnar connecting parts and the connector cover body due to secular change, etc., the connector cover can be kept at the completely closing position securely so as to prevent dust from entering into the opening.

8 Claims, 5 Drawing Sheets

CONNECTOR COVER FOR PORTABLE TERMINAL

BACKGROUND OF THE INVENTION

1. Field of the Invention

The present invention relates to improvements in a connector cover for a portable terminal, for use in covering an opening formed in a casing of the portable terminal corresponding to the arrangement position of a connector for external connection.

2. Related Art

As a connector cover for a portable terminal covering an opening formed in a casing of the portable terminal, one disclosed in Japanese Patent Application Laid-open No. 2003-258964 (FIGS. 3 and 4, hereinafter referred to as Patent Document 1) is well-known. Further, as a general technique for securing a detachable covering member to the main body, a mounting structure of a decorative panel disclosed in Japanese Patent Application Laid-open No. 2001-317774 (FIGS. 6, 7 and 8, hereinafter referred to as Patent Document 2), for example, is well-known.

FIG. 1 shows a conventional connector cover for a portable terminal disclosed in Patent Document 1 as an example showing a specific configuration thereof. FIG. 1 is a horizontal sectional view partially showing the periphery of the mounting position of the connector cover, in the state where a portable terminal such as a mobile phone, a PHS, or a palmtop computer is disposed normally, taken by a horizontal plane across the center part in the thickness direction thereof.

As shown in FIG. 1, a casing 100 of the portable terminal has an opening 102 formed corresponding to the arrangement position of a connector 101 for external connection built in the casing 100, and is adopted to enable a connector cover 103 for covering the opening 102 to be mounted detachably. Specifically, on both sides of the opening 102, holes 104 and 104 are perforated, into which columnar connecting parts 105 and 105 of the connector cover 103 are inserted and fitted, whereby the opening 102 of the casing 100 is covered with the connector cover 103.

The tip of each columnar connecting part 105 has a tapered, diameter enlarged portion 106 formed integrally, and has a deformation allowing groove 107 radially penetrating the tip of the columnar connecting part 105 including the diameter enlarged portion 106. By the deformation allowing groove 107, the diameter enlarged portion 106 is divided into plural pieces, and the approaching/separating operation performed between the pieces is allowed by the elastically deforming action of the columnar connecting part 105.

Accordingly, in the state of the connector cover 103 being removed, when the tips of the diameter enlarged portions 106 of the columnar connecting parts 105 are inserted into the holes 104 of the casing 100 from the outside, the tapered faces of the pieces of the diameter enlarged portions 106 divided by the deformation allowing grooves 107 slidingly contact the inner peripheral faces of the holes 104, and are pressed from the radially outside. Thereby, the pieces of the diameter enlarged portions 106 are approaching each other, so that the outer diameters of the tip portions of the columnar connecting parts 105 are reduced, whereby the columnar connecting parts 105 are allowed to enter into the holes 104. Upon the tips of the columnar connecting parts 105 having penetrated the holes 104, the diameter enlarged portions 106 are elastically returned to the original state so that the diameters become enlarged. This prevents unintentional detachment of the columnar connecting parts 105 from the holes 104.

As obvious from FIG. 1, the diameter enlarged portions 106 are only formed at the tips of the columnar connecting parts 105, whereby the connector cover 103 can approach/separate freely within a certain range with respect to the casing 100 even in the state of the connector cover 103 being applied to the casing 100. Therefore, if the casing 100 and the connector cover 103 are left in the state of allowing a gap between them, there is caused a problem of dust being entered inside the casing 100 from the opening 102.

Conventionally, in order to solve such a problem so as to keep the connector cover 103 at a completely closing position as shown in FIG. 1, fitting between the columnar connecting parts 105 and the holes 104 has been adjusted to be tight fitting, or the columnar connecting parts 105 have been formed to be slightly sloped so as to secure the fastening force between the base parts of the columnar connecting parts 105 and the holes 104. However, deformation and dimensional changes due to repetition of attaching/detaching operations of the connector cover 103 or secular change, for example, make the fastening force between the base parts of the columnar connecting parts 105 and the holes 104 insufficient. This causes such a shortcoming that the connector cover 103 cannot be kept at the completely closing position.

On the other hand, in a general mounting structure of a covering member as disclosed in Patent Document 2, a pawl is provided at the tip of an arm having a sufficient span, and the arm is flexed by elastic deformation to thereby engage the pawl at the tip with an object such as a stopper. This structure can cope with deformation and dimensional changes due to some abrasion or secular change. However, since the span of the arm must be set to have a sufficient length, this structure is not suitable for a small product such as a connector cover for a portable terminal.

SUMMARY OF THE INVENTION

An object of the present invention is to improve shortcomings in the conventional art, and to provide a connector cover for a portable terminal which is hardly influenced by deformation and dimensional changes due to repetition of attaching/detaching operations or secular change, and capable of closing the opening of the casing securely so as to prevent dust from being entered inside the casing.

The present invention relates to a connector cover for a portable terminal, for use in covering an opening formed in a casing of the portable terminal corresponding to the arrangement position of a connector for external connection. In order to achieve the aforementioned object, the connector cover comprises: a columnar connecting parts inserted and fitted in holes perforated in both sides of the opening of the casing; and protruding portions which are formed on the base parts of the columnar connecting parts, and engage with the edges of the holes from the rear face sides in the state of the columnar connecting parts having been inserted in the holes completely.

In the aforementioned configuration, the columnar connecting parts of the connector cover for the portable terminal are inserted in the holes perforated in both sides of the opening of the casing, whereby the opening of the casing is covered with the connector cover for the portable terminal.

On the base parts of the columnar connecting parts of the connector cover, protruding portions are formed, which engage with the edges of the holes from the rear face sides in the state of the columnar connecting parts having been inserted in the holes completely. Therefore, regardless of deformation and dimensional changes of the columnar connecting parts and the connector cover body due to the repetition of attaching/detaching operations of the connector cover or secular change, the connector cover can be kept at the completely closing position with engagements between the protruding portions and the back faces of the edge of the holes. This prevents dust from entering inside the casing caused by the connector cover being spaced apart from the casing unintentionally.

Further, when the columnar connecting parts of the connector cover are inserted into the holes, the sliding resistance between the inner peripheral face of the holes and the columnar connecting parts changes at the timing that the protruding portions come to the rear face sides of the edges of the holes, so that the user's hand pushing the connector cover can feel a clicking sense. Therefore, the user can easily find that the connector cover has been surely pushed up to the right position.

It is desirable that the protruding portion of the columnar connecting part be formed of a protrusion protruded radially outward at a place in a circumferential direction of the columnar connecting part.

With this configuration, the slide-connecting resistance between the inner peripheral face of the hole of the casing and the base part of the columnar connecting part is reduced comparing with a case that the protruding portion is formed around the whole periphery in the circumferential direction of the columnar connecting part, and also catching-on between the edge of the hole of the casing and the protruding portion is reduced. Therefore, durability against abrasion and scuffing of the protruding portion due to repetition of attaching/detaching operations is improved.

It is desirable that the protruding portion of the columnar connecting part have a slope in which the protruding amount is reduced gradually from the center part of the protruding portion to the tip of the columnar connecting part, in the contour shown in a horizontal sectional view including the central axis of the columnar connecting part and the forming position of the protruding portion.

With this configuration, the slide-connecting resistance and catching-on between the inner peripheral face of the hole and the protruding portion of the columnar connecting part, caused when the columnar connecting part is inserted into the hole of the casing, can be reduced in particular. Therefore, durability against abrasion and scuffing of the protruding portion due to repetition of attaching/detaching operations is improved.

Further, the protruding portion may have a slope in which the protruding amount is reduced gradually from the center part to both sides of the protruding portion, in the contour shown in a horizontal sectional view including the central axis of the columnar connecting part and the forming position of the protruding portion.

With this configuration, the slide-connecting resistance and catching-on between the inner peripheral face of the hole and the protruding portion of the columnar connecting part can be reduced when the columnar connecting part is inserted into the hole of the casing, and also drawn out of the hole. Therefore, durability against abrasion and scuffing of the protruding portion due to repetition of attaching/detaching operations is improved.

Further, the protruding portion of the columnar connecting part may be formed of a protruding strip protruded radially outward around the whole periphery at a place in the axial direction of the columnar connecting part.

With this configuration, the slide-contacting resistance and catching-on between the inner peripheral face of the hole and the protruding portion of the columnar connecting part tend to increase, comparing with the case where a protruding portion is formed of a protrusion protruded radially outward at a place in the circumferential direction. Therefore, it is desirable that the protruding amount of the protruding portion be reduced relatively, or the diameter of the hole be enlarged by forming a slit in the hole of the casing, for example.

Further, in addition to the aforementioned configurations, the outer periphery of the connector cover body may have an engaged portion capable to be in a recess-protrusion engagement with an engaging portion formed in an inner wall of a connector cover fitting groove defined in the casing so as to surround the opening.

With this configuration, the engaging portion of the connector cover fitting groove provided in the casing and the engaged portion provided on the outer periphery of the connector cover body are fitted to each other in a recess-protrusion engagement so as to fix the connector cover. Therefore, the connector cover is prevented to become loose with redundancy.

In each of the aforementioned configuration, it is desirable that the connector cover for a portable terminal be formed of an easily elastically deformable material, integrally.

The protruding portion of the columnar connecting part itself is elastically deformable so as to reduce the slide-contacting resistance and catching-on between the inner peripheral face of the hole and the protruding portion of the columnar connecting part. Therefore, regardless of the material characteristics of the casing of the portable terminal, more specifically, regardless of the level of the elasticity or toughness, durability against abrasion and scuffing of the protruding portion due to repetition of attaching/detaching operations is ensured.

The connector cover for a portable terminal according to the present invention is so configured that protruding portions are formed on the base parts of the columnar connecting parts which are inserted and fitted in the holes perforated in both sides of the opening of the casing, and the protruding portions engage with the edges of the holes from the rear face sides in the state of the columnar connecting parts having been inserted in the holes completely. Therefore, regardless of deformation and dimensional changes of the columnar connecting parts and the connector cover body due to the repetition of attaching/detaching operations of the connector cover or secular change, the connector cover can be kept at the completely closing position with engagements between the protruding portions and the back faces of the edges of the holes. This prevents dust from entering inside the casing.

Further, when the columnar connecting parts of the connector cover are inserted into the holes, the sliding resistance between the inner peripheral face of the holes and the columnar connecting parts changes at the timing that the protruding portions come to the rear face sides of the edges of the holes, so that the user's hand pushing the connector cover can feel a clicking sense. Therefore, the user can easily find that the connector cover has been surely pushed up to the right position.

PREFERRED EMBODIMENT OF THE INVENTION

Figure 2:
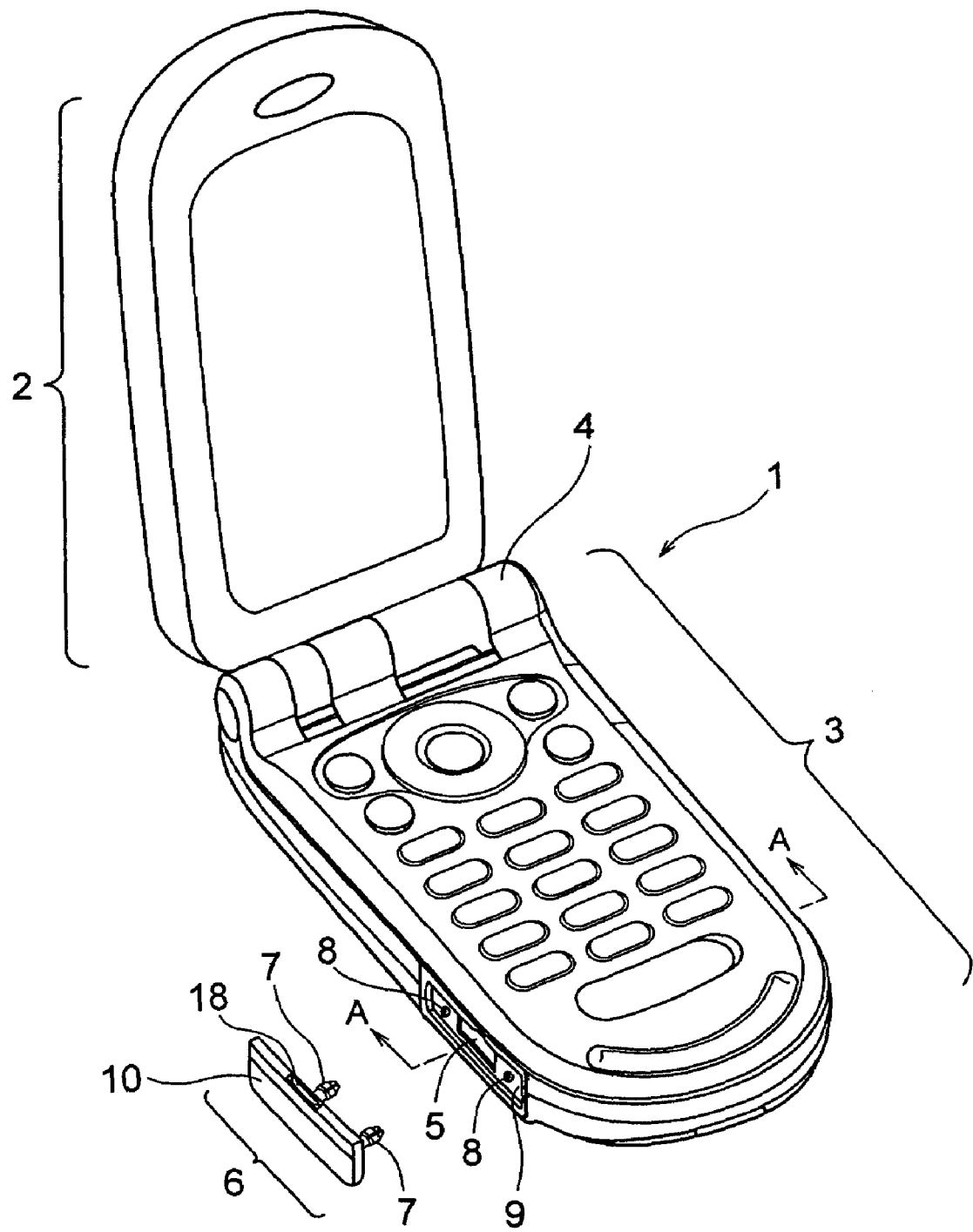
FIG. 2 is a perspective view showing an embodiment in which a connector cover for a portable terminal of the present invention is applied to a mobile phone.

FIG. 2 shows an embodiment in which a connector cover for a portable terminal of the present invention is applied to a mobile phone which is a kind of a portable terminal.

The body of the mobile phone 1 is composed of: a display unit 2 having a display screen, a speaker and the like; and a casing 3 having various manipulation buttons, a microphone and the like, and incorporating an electronic circuit board therein. The display unit 2 and the casing 3 are connected foldably via a hinge 4.

In the example shown in FIG. 2, an opening 5 is formed in one side of the casing 3, corresponding to the arrangement position of a connector for external connection built in the casing 3. Depending on the arrangement position of the connector for external connection, the opening 5 may be formed at another position in the outer periphery of the casing 3 or in the rear face of the casing 3.

The connector for external connection described herein is a connector for connecting external equipment or a connector for connecting a power source for charging, for example.

The casing 3 is provided with holes 8 and 8, perforated on both sides of the opening 5, into which columnar connecting parts 7 and 7 of a connector cover 6 for a portable terminal are inserted and fitted, and also provided with a connector cover fitting groove 9 formed so as to surround the opening 5.

The connector cover fitting groove 9 is a substantially rectangle recess not exceeding the wall thickness of the casing 3. The dimensions of the groove substantially consist with the outer dimensions of the connector cover body 10 constituting the main part of the connector cover 6, and the depth of the groove substantially consists with the thickness of the connector cover body 10.

The connector cover body 10 has a nail groove 18 used as a finger-grip recess when the connector cover 6 is drawn out of the connector cover fitting groove 9.

Next, the structure of each part of the contact cover 6 and the peripheral structure of the opening 5 and the holes 8 and 8 in the casing 3 will be described with some examples.

EXAMPLE 1

Figure 3:
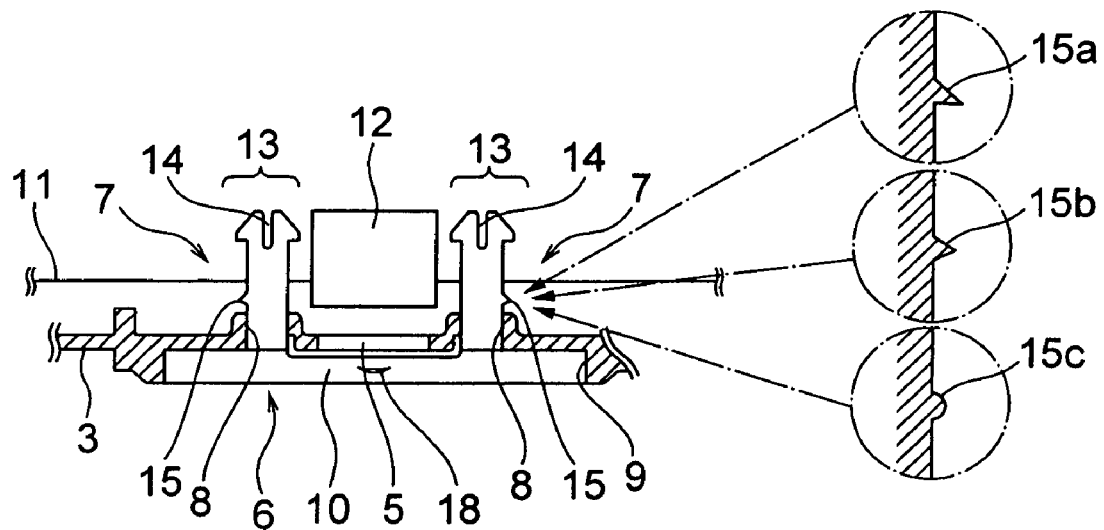
FIG. 3 is a horizontal sectional view showing the mounting structure and the peripheral structure of a connector cover in a mobile phone of an example.
Figure 4:
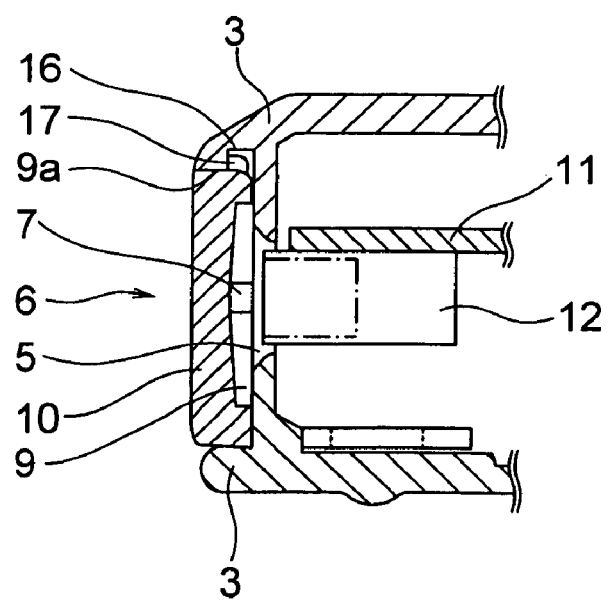
FIG. 4 is a vertical sectional view showing the mounting structure and the peripheral structure of the connector cover in the mobile phone of the example (example 1)

FIG. 3 is a horizontal sectional view partially showing the periphery of the mounting position of the connector cover 6, in the state where the mobile phone 1 is normally disposed as shown in FIG. 2, taken by a horizontal plane across the center part in the thickness direction of the casing 3. FIG. 4 is a vertical sectional view partially showing the periphery of the mounting position of the connector cover 6, taken along the line A—A of FIG. 2 across the casing 3.

As shown in FIG. 3, the casing 3 has the opening 5 formed corresponding to the arrangement position of a connector 12 for external connection fixed to the electronic circuit board 11 built in the casing 3, and is adopted to enable the connector cover 6 for covering the opening 5 to be mounted detachably.

Specifically, on both sides of the opening 5, the holes 8 and 8 with sleeve thick portions are perforated, into which the columnar connecting parts 7 and 7 of the connector cover 6 are inserted and fitted, whereby the opening 5 of the casing 3 is covered with the connector cover body 10.

The columnar connecting parts 7 and 7 of the connector cover 6, made of an easily elastically deformable material such as elastomeric resin, are formed integrally with the connector cover body 10. The tip of each columnar connecting part 7 has a tapered, diameter enlarged portion 13 formed integrally. With a deformation allowing groove 14 radially penetrating the tip of the columnar connecting part 7 including the diameter enlarged portion 13, the approaching/separating action performed between the pieces of the diameter enlarged portion 13 divided into plural pieces, that is, substantial diameter reducing action and diameter enlarging action of the tip portion of the columnar connecting part 7, are allowed.

Figure 1:
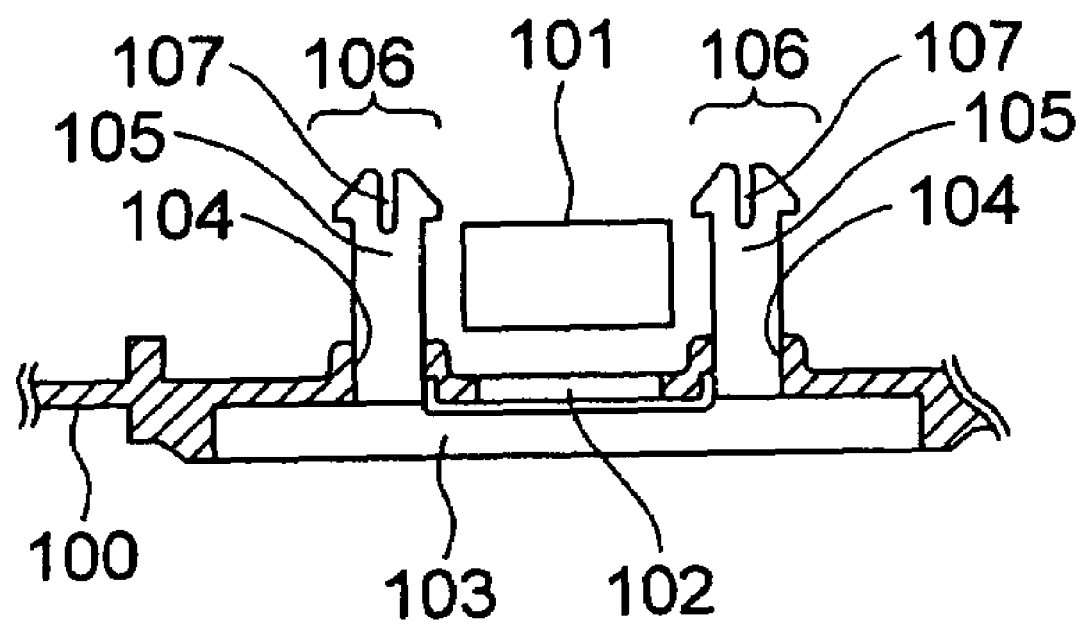
FIG. 1 is a horizontal sectional view showing an example of the specific configuration of a conventional connector cover for a portable terminal.

Accordingly, in the state of the connector cover 6 being removed, when the tips of the diameter enlarged portions 13 of the columnar connecting parts 7 are inserted into the holes 8 from the outside, the tapered faces of the pieces of the diameter enlarged portions 13 divided by the deformation allowing grooves 14 slidingly contact the inner peripheral faces of the holes 8, and are pressed from the radially outside. Thereby, the diameters of the tips of the columnar connecting parts 7 are reduced, so that the columnar connecting parts 7 are allowed to enter into the holes 8. Upon the tips of the columnar connecting parts 7 having penetrated the holes 8, the diameter enlarged portions 13 are elastically returned to the original state so that the diameters become enlarged. This prevents unintentional detachment of the columnar connecting parts 7 from the holes 8. This aspect is similar to that of the conventional example which has been described with reference to FIG. 1.

In the present example, the base part of each columnar connecting part 7 is further provided with a protruding portion 15 engaging with the edge of the hole 8 from the back face side of the casing 3 in the state of the columnar connecting part 7 being inserted in the hole 8 completely.

As shown in FIG. 3, the protruding portion 15 is protruded radially outward at a place in the circumferential direction of the columnar connecting part 7, so the shape is a knob-like protrusion substantially.

In order to close the opening 5 of the casing 3 with the connector cover 6 completely, the columnar connecting parts 7 must be pushed into the holes 8 until the protruding portions 15 penetrate the holes 8. Since each protruding portion 15 consists of a protrusion protruded radially outward at a place in the circumferential direction of the columnar connecting part 7, that is, a knob-like protrusion, a slide-connecting resistance between the inner peripheral face of the hole 8 and the base part of the columnar connecting part 7 is smaller comparing with a case of forming a protruding portion of a flange around the outer periphery of the columnar connecting part 7. Further, protruding portion 15 is less caught on the edge of the hole 8. This provides such a merit that troubles such as abrasion and scuffing of the protruding portion 15 due to repetition of attaching/detaching operations of the connector cover 6 are less caused.

Further, when the protruding portion 15 comes to the rear face side of the edge of the hole 8, the sliding resistance between the inner peripheral face of the hole 8 and the columnar connecting part 7 changes, so that the user's hand pushing the connector cover 6 can feel a clicking sense. Therefore, the user can easily find that the connector cover 6 has been surely pushed up to the right position.

Then, the protruding portions 15 of the columnar connecting parts 7 pushed to the completely closing positions engage with the edges of the holes 8 from the rear face sides as shown in FIG. 3. Accordingly, regardless of deformation and dimensional changes of the columnar connecting parts 7 and the connector cover body 10 due to the repetition of attaching/detaching operations of the connector cover 6 or secular change, the connector cover 6 can be kept at the completely closing position with engagements between the protruding portions 15 and the back faces of the holes 8. This prevents dust from entering inside the casing 3 caused by the connector cover 6 being spaced apart from the casing 3 unintentionally.

The protruding portion 15 may be shaped as: a wedge with a slope in which the protruding amount is reduced gradually from the center part of the protruding portion 15 to the tip of the columnar connecting part 7 (15a in FIG. 3); a cone with a slope in which the protruding amount is reduced gradually from the center part to both sides of the protruding portion 15 (15b in FIG. 3); or a hemisphere (15c in FIG. 3), for example, in the contour shown in a horizontal section including the central axis of the columnar connecting part 7 and the forming position of the protruding portion 15.

In a case where the protruding portion 15 of wedge shape is applied, the slide-connecting resistance and catching-on between the inner peripheral face of the hole 8 and the protruding portion 15, caused when the columnar connecting part 7 is inserted into the hole 8, can be reduced in particular. In a case where the protruding portion 15 of conical shape or hemispherical shape is applied, the slide-connecting resistance and catching-on between the inner peripheral face of the hole 8 and the protruding portion 15 can be also reduced even when the columnar connecting part 7 is drawn out of the hole 8. Accordingly, in any case irrespective of the configuration to be applied, a preventive effect against troubles such as abrasion and scuffing of the protruding portion 15 due to repetition of attaching/detaching operations of the connector cover 6 is improved.

Further, the protruding portion 15 is a part of the columnar connecting part 7 integrally formed with the connector cover body 10, made of an easily elastically deformable material such as elastomeric resin, so the protruding portion 15 itself is elastically deformable. Therefore, excessive slide-connecting resistance or catching-on can be prevented due to the elastic deformation. In the case of the connector cover 6 being formed of an easily elastically deformable material integrally, the diameter enlarged portions 14 and the protruding portions 15 can pass through the holes 8 without the holes 8 being elastically deformed to be ellipse or diametrically enlarged, whereby there is no need to consider the material characteristics of the casing 3, for example, elasticity or toughness thereof.

Further, in the present example, the casing 3 has a dented engaging portion 16 formed in the inner wall 9a of the connector cover fitting groove 9 surrounding the opening 5, as shown in FIG. 4, and the connector cover body 10 has an engaged portion 17 consisting of a tongue on the outer periphery thereof.

In the state where the columnar connecting parts 7 are completely pushed into the holes 8 as shown in FIGS. 2 and 3, in addition to the engagements between the protruding portions 15 and the back face of the edges of the holes 8 as described above, the engaging portion 16 and the engaged portion 17 are fitted to each other in a recess-protrusion engagement. Therefore, the connector cover 6 is prevented to become loose with redundancy.

EXAMPLE 2

Figure 5:
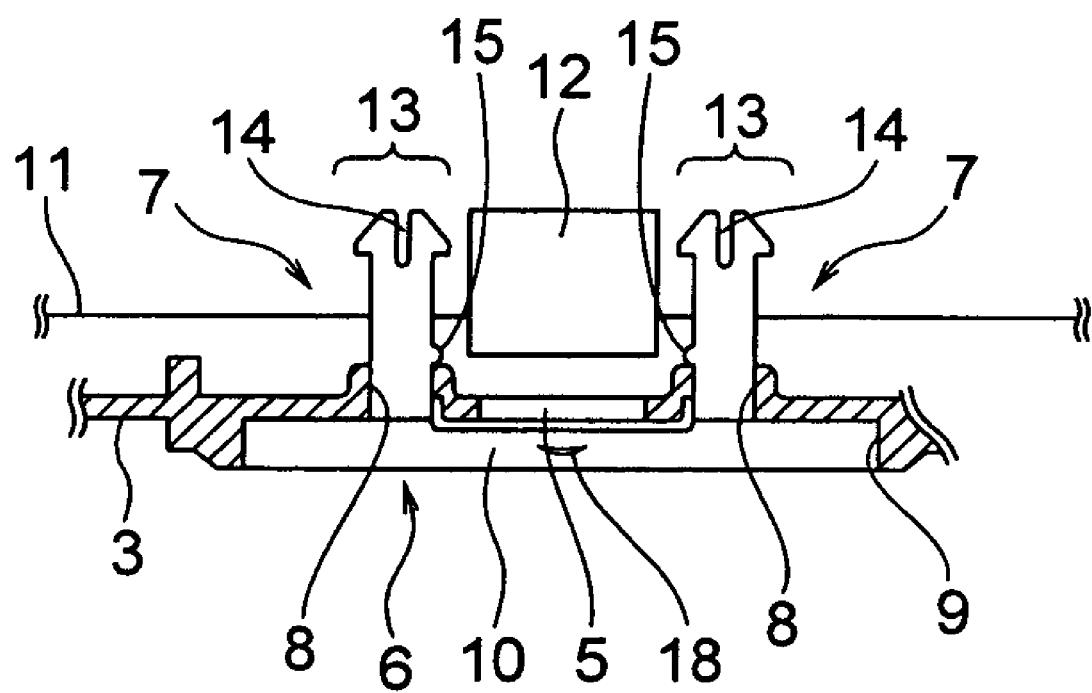
FIG. 5 is a horizontal sectional view showing the mounting structure and the peripheral structure of a connector cover in a mobile phone of another example (example 2)

FIG. 5 is a horizontal sectional view showing another example, in which the forming positions of the protruding portions 15 on the columnar connecting parts 7 are different from those of the example shown in FIG. 3. In the example of FIG. 3, the forming positions of the protruding portions 15 are relatively outward, and in the example of FIG. 5, the forming positions of the protruding portions 15 are relatively inward. However, this does not cause any specific difference in the operational effect.

Even in either example shown in FIG. 3 or FIG. 5, the protruding portion 15 consisting of a knob-like protrusion is formed at a place in the circumferential direction of the columnar connecting part 7. However, it is possible to form protruding portions 15 at several places in the circumferential direction of the columnar connecting part 7 within a range not causing a trouble in attaching/detaching operations of the connector cover 6 for a portable terminal.

EXAMPLE 3

Figure 6A:
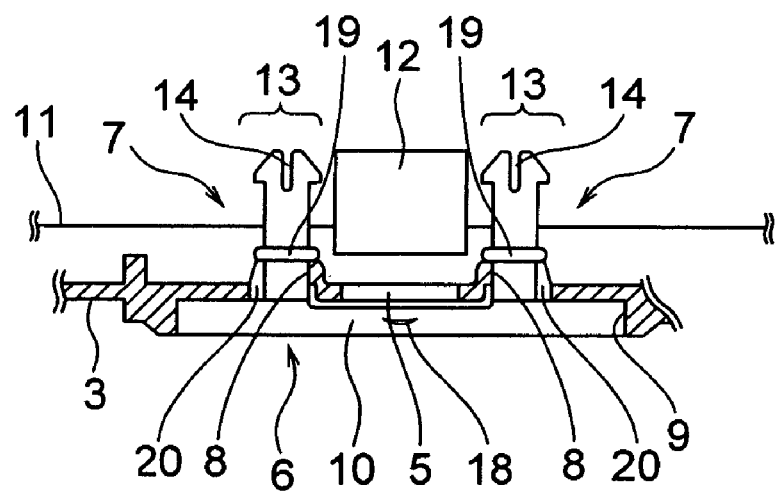
FIG. 6(a) is a horizontal sectional view showing the mounting structure and the peripheral structure of a connector cover in a mobile phone of still another example.
Figure 6B:
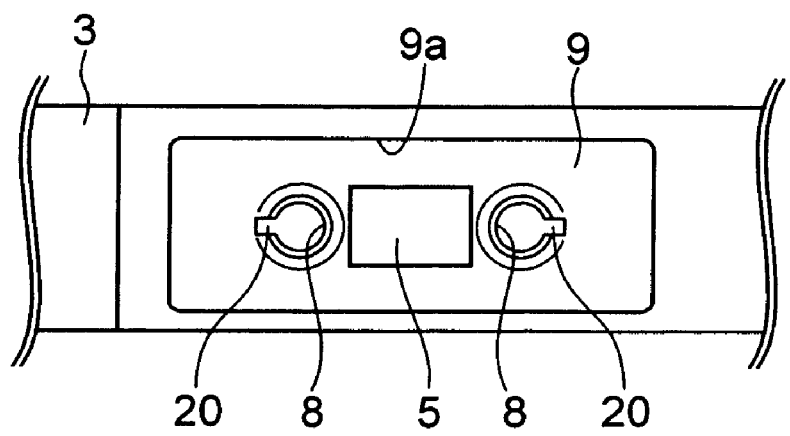
FIG. 6(b) shows a front view showing the peripheral structure of a connector cover fitting groove provided in the casing (example 3).

FIGS. 6(a) and 6(b) show still another example. FIG. 6(a) is a horizontal sectional view partially showing the periphery of the mounting position of the connector cover 6, in the state where the mobile phone 1 is normally disposed as shown in FIG. 2, taken by a horizontal plane across the center part in the thickness direction of the casing 3. FIG. 6(b) is a front view showing the peripheral structure of the connector cover fitting groove 9 in the state of the connector cover 6 being removed from the casing 3.

In this example, a protruding portion 19 positioned at the base part of the columnar connecting part 7 is formed of a protruding strip, which is the structural difference from respective examples described above.

As shown in FIG. 6(a), the protruding portion 19 is a protruding strip protruded radially outward around the whole periphery at a place in the axial direction of the columnar connecting part 7. Accordingly, the shape is a ring flange substantially.

With this configuration, the protruding portions 19 engage with the edges of the holes 8 around the whole periphery from the rear face sides of the casing 3 in the state of the connector cover 6 being applied completely as shown in FIG. 6(a). Therefore, the connector cover 6 can be kept at the completely closing position in an extremely secured manner.

However, in the case of such a configuration being applied, the slide-contacting resistance and catching-on between the inner peripheral face of the hole 8 and the protruding portion 19 of the columnar connecting part 7 tend to increase, comparing with each example described above in which a protruding portion is formed of a protrusion protruded radially outward at a place in the circumferential direction of the columnar connecting part. Therefore, it is desirable that the protruding amount of the protruding portion 19 be reduced relatively, or a part of the inner diameter of the hole 8 be enlarged with a slit 20 formed in the edge of the hole 8 of the casing 3 for example, as shown in FIGS. 6(*a*) and 6(*b*).

Of course, this is not the case if the protruding portion 19, or a ring flange, is elastically deformable quite easily due to the material of the connector cover 6 for a portable terminal with which the protruding portion 19 is formed integrally, or the hole 8 is elastically deformable to enlarge the diameter since the material of the casing 3 has sufficient elasticity and toughness. In such a case, the slit 20 is not required.

INDUSTRIAL AVAILABILITY

The present invention can be applied to portable terminals such as mobile telephones as well as PHS and palmtop computers.

What is claimed is:

1. A connector cover for a portable terminal, comprising:
a connector cover body for covering an opening formed in a casing of the portable terminal corresponding to an arrangement position of a connector for external connection,
a columnar connecting part inserted and fitted in a hole of the casing; and
a protruding portion formed on a base part of the columnar connecting part, wherein
the protruding portion is inserted in the hole integrally with the columnar connecting part, and engages with an edge of the hole from a rear face side in a state of having passed through the hole; and
wherein an outer periphery of the connector cover body has an engaged portion which is in a recess-protrusion engagement with an engaging portion formed in an inner wall of a connector cover fitting groove defined in the casing so as to surround the opening.

2. The connector cover for the portable terminal, as claimed in claim 1, wherein the columnar connecting parts and the protruding portions are inserted in the holes formed on both sides of the opening of the casing.

3. The connector cover for the portable terminal, as claimed in claim 1, wherein the protruding portion is formed of a protrusion protruded radially outward at a place in a circumferential direction of the columnar connecting part.

4. The connector cover for the portable terminal, as claimed in claim 3, wherein the protruding portion has a slope in which a protruding amount is reduced gradually from a center part of the protruding portion to a tip of the columnar connecting part, in a contour shown in a horizontal sectional view including a central axis of the columnar connecting part and a forming position of the protruding portion.

5. The connector cover for the portable terminal, as claimed in claim 3, wherein the protruding portion has a slope in which a protruding amount is reduced gradually from a center part to both sides of the protruding portion, in a contour shown in a horizontal sectional view including a central axis of the columnar connecting part and a forming position of the protruding portion.

6. The connector cover for the portable terminal, as claimed in claim 1, wherein the protruding portion is formed of a protruding strip protruded radially outward around a whole periphery at a place in an axial direction of the columnar connecting part.

7. The connector cover for the portable terminal, as claimed in claim 1, wherein the protruding portion is formed of a protruding strip protruded radially outward around a whole periphery at a place in an axial direction of the columnar connecting part, and
the protruding portion is inserted in the hole in which a part of an inner diameter thereof is enlarged.

8. The connector cover for the portable terminal, as claimed in claim 1, wherein the connector cover body, the columnar connecting part and the protruding portion are formed of an easily elastically deformable material integrally.

* * * * *